(12) United States Patent
Abe et al.

(10) Patent No.: US 8,356,512 B2
(45) Date of Patent: Jan. 22, 2013

(54) ALTERNATIVE FUEL CONCENTRATION ESTIMATING SYSTEM, VEHICLE COMPRISING ALTERNATIVE FUEL CONCENTRATION ESTIMATING SYSTEM, AND ALTERNATIVE FUEL CONCENTRATION ESTIMATING METHOD

(75) Inventors: Takashi Abe, Kobe (JP); Sou Kurosaka, Kobe (JP); Yoshinobu Mori, Kobe (JP); Shinichi Kuratani, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 93 days.

(21) Appl. No.: 13/133,373

(22) PCT Filed: Nov. 30, 2009

(86) PCT No.: PCT/JP2009/006462
§ 371 (c)(1),
(2), (4) Date: Jun. 7, 2011

(87) PCT Pub. No.: WO2010/067527
PCT Pub. Date: Jun. 17, 2010

(65) Prior Publication Data
US 2011/0239750 A1 Oct. 6, 2011

(30) Foreign Application Priority Data
Dec. 8, 2008 (JP) .................................. 2008-311768

(51) Int. Cl.
*G01M 15/04* (2006.01)
(52) U.S. Cl. ..................................... 73/114.45; 73/23.32

(58) Field of Classification Search ................. 73/23.32, 73/114.45
See application file for complete search history.

(56) References Cited

U.S. PATENT DOCUMENTS

| | | | |
|---|---|---|---|
| 6,975,933 B2 * | 12/2005 | Abe et al. ...................... | 701/109 |
| 7,865,295 B2 * | 1/2011 | Tashima ........................ | 701/109 |
| 8,011,231 B2 * | 9/2011 | Maeda et al. .............. | 73/114.45 |
| 8,225,647 B2 * | 7/2012 | Mukai ......................... | 73/114.55 |

FOREIGN PATENT DOCUMENTS

JP 56-098540 8/1981
(Continued)

OTHER PUBLICATIONS

Isa Japanese Patent Office, International Search Report of PCT/JP2009/006462, Dec. 22, 2009, 2 pages.

*Primary Examiner* — Freddie Kirkland, III
(74) *Attorney, Agent, or Firm* — Alleman Hall McCoy Russell & Tuttle LLP

(57) ABSTRACT

An ECU is used in a motorcycle including an engine E, which combusts in a combustion chamber a blended fuel in which gasoline and ethanol are blended, and a fuel injection device for injecting a fuel with a predetermined fuel injection amount such that an air excess ratio in the combustion chamber is a first predetermined value when an ethanol concentration of the blended fuel is zero. The ECU executes $O_2$ feedback control based on an $O_2$ concentration derived from an output of an $O_2$ sensor. Further, the ECU calculates an actual fuel compensation ratio by dividing a fuel injection amount after the $O_2$ feedback control by a predetermined fuel injection amount, and estimates the concentration of the alternative fuel based on this actual fuel compensation ratio and a first predetermined value stored in the ECU.

9 Claims, 8 Drawing Sheets

FOREIGN PATENT DOCUMENTS

| | | |
|---|---|---|
| JP | 63-005130 | 1/1988 |
| JP | 05-163992 | 6/1993 |
| JP | 2003-120363 A | 4/2003 |
| JP | 2005-048625 A | 2/2005 |
| JP | 2008-144723 A | 6/2008 |
| JP | 2008-175186 A | 7/2008 |

* cited by examiner

US 8,356,512 B2

ALTERNATIVE FUEL CONCENTRATION ESTIMATING SYSTEM, VEHICLE COMPRISING ALTERNATIVE FUEL CONCENTRATION ESTIMATING SYSTEM, AND ALTERNATIVE FUEL CONCENTRATION ESTIMATING METHOD

TECHNICAL FIELD

The present invention relates to an alternative fuel concentration estimating system for estimating a concentration of an alternative fuel contained in a blended fuel in which the alternative fuel is blended with a basic fuel, in an internal combustion engine which combusts the blended fuel, a vehicle comprising the alternative fuel concentration estimating system, and an alternative fuel concentration estimating method.

BACKGROUND ART

There are so-called engines for FFV, which are driven using a blended fuel in which an alternative fuel, for example, an alcohol fuel such as ethanol or methanol is blended with gasoline, as well as the gasoline. A theoretical air-fuel ratio and an octane number are different between the gasoline and the alternative fuel. For this reason, the theoretical air-fuel ratio, the octane number, etc., of the blended fuel vary according to the concentration of the alternative fuel. Therefore, in the engines for FFV, air-fuel ratio and ignition timing are varied according to the concentration of the alternative fuel to improve combustion efficiency of the blended fuel to increase driving power. Therefore, the concentration of the alternative fuel is preferably detected or estimated preliminarily.

As a method of detecting the concentration of the alternative fuel, for example, there is a method in which an alcohol concentration sensor is attached on a fuel system to directly measure the concentration of the alternative fuel, as disclosed in patent literature 1. In this method, it is necessary to attach the alcohol concentration sensor on the fuel system, thereby increasing components in number. Because of this, a method of estimating the concentration of the alternative fuel is used instead of directly measuring the concentration of the alternative fuel.

Patent literature 2 and patent literature 3 disclose exemplary methods of estimating the concentration of the alternative fuel. Patent literature 2 discloses a method in which a concentration of an alcohol fuel is calculated with reference to a compensation coefficient calculated during $O_2$ feedback control. Patent literature 3 discloses a method of estimating a concentration of an alcohol fuel based on a correlation between a concentration of an alcohol fuel and a compensation coefficient obtained in $O_2$ feedback control using an $O_2$ sensor attached on an exhaust system.

CITATION LIST

Patent Literature

Patent literature 1: Japanese Laid-Open Patent Application Publication No. Sho. 56-98540
Patent literature 2: Japanese Laid-Open Patent Application Publication No. Sho. 63-5130
Patent literature 3: Japanese Laid-Open Patent Application Publication No. Hei. 5-163992

SUMMARY OF THE INVENTION

Solution to Problem

The concentration calculation methods disclosed in patent literatures 2 and 3 are used in an engine (hereinafter also referred to as "engine operating with a theoretical air-fuel ratio") operating while maintaining an air excess ratio in a combustion chamber at 1, all the time, like an engine of a four-wheeled automobile. Therefore, in these methods, consideration is not given to a case where the concentration of the alternative fuel is estimated in an engine (hereinafter also referred to as "engine operating in a fuel-rich state") in which combustion occurs in a fuel-rich state where an air excess ratio in a combustion chamber is basically less than 1, like an engine of a motorcycle or the like.

The air excess ratio in the combustion chamber during operation is different between the engine operating with the theoretical air-fuel ratio and the engine operating in the fuel-rich state, and therefore, there is a difference in compensation coefficient calculated during $O_2$ feedback control between them. For this reason, it is difficult to apply the concentration calculation methods disclosed in patent literatures 2 and 3 to the engine operating in the fuel-rich state without modifying it.

Accordingly, to apply the above concentration calculation methods to the engine operating in the fuel-rich state, it is necessary to place the engine in a theoretical air-fuel ratio state and then execute the concentration calculation method by $O_2$ feedback control. This makes a step of calculating the concentration complicated.

In the four-wheeled automobile, the $O_2$ feedback control is a control for setting the air excess ratio in the combustion chamber to 1. However, in the $O_2$ feedback control for, for example, a motorcycle, a target value of the air excess ratio is in some cases set to a value other than 1. Therefore, if the estimating method intended for the four-wheeled automobile is applied to the motorcycle, the concentration of the alternative fuel in the blended fuel cannot be estimated accurately, in some cases.

An object of the present invention is to provide an alternative fuel concentration calculating system which is capable of initiating calculation of a concentration of an alternative fuel in a blended fuel while maintaining an air excess ratio at a first predetermined value before compensating a fuel injection amount in an internal combustion engine which combusts the blended fuel in a state where the air excess ratio is set to the first predetermined value.

Another object of the present invention is to provide an alternative fuel concentration calculating system which is capable of calculating the concentration of the alternative fuel in the blended fuel with high accuracy, even when compensating the fuel injection amount of the fuel injection device so that the air excess ratio in the combustion chamber reaches a second predetermined value based on a concentration of at least one component gas contained in an exhaust gas which is derived based on an output value from an exhaust gas sensor provided in an exhaust system in the internal combustion engine.

Solution to Problem

An alternative fuel concentration estimating system of the present invention is an alternative fuel concentration estimating system which is applied to an object including an internal combustion engine which combusts fuel in a combustion chamber, a blended fuel in which an alternative fuel is mixed with a basic fuel and a fuel injection device in which a predetermined fuel injection amount is preset such that an air excess ratio in the combustion chamber is a first predetermined value other than 1 when a concentration of the alternative fuel in the blended fuel is zero, comprising an air excess ratio control means for compensating a fuel injection amount of the fuel injection device so that the air excess ratio in the combustion chamber reaches a second predetermined value, based on a concentration of at least one component gas contained in an exhaust gas which is derived from an output value of an exhaust gas sensor provided in an exhaust system of the internal combustion engine, and a fuel compensation ratio calculating means for calculating an actual fuel compensation ratio by dividing by the predetermined fuel injection amount, the fuel injection amount having been compensated so that the air excess ratio in the combustion chamber reaches the second predetermined value, based on the concentration of the component gas; and a concentration estimating means for estimating the concentration based on the actual fuel compensation ratio calculated by the fuel compensation ratio calculating means, and the first predetermined value.

In accordance with the present invention, by using the first predetermined value in addition to the actual fuel compensation ratio calculated by the fuel compensation ratio calculating means, the estimation of the concentration of the alternative fuel in the blended fuel can be initiated while maintaining the air excess ratio at the first predetermined value before compensating the fuel injection amount, in the internal combustion engine in which combustion occurs in a state where the air excess ratio in the combustion chamber is other than 1 and is not a theoretical air-fuel ratio. Therefore, unlike the conventional technique, it is not necessary to set the air excess ratio in the combustion chamber to 1 before compensating the fuel injection amount, the number of steps for estimating the concentration is reduced, and the concentration can be easily estimated. In the conventional technique, it is necessary to execute the $O_2$ feedback control when the concentration of the alternative fuel in the blended fuel is zero to preliminarily find the fuel injection amount with which the air excess ratio is 1. However, in the present invention, the concentration of the alternative fuel in the blended fuel can be estimated by referring to the first predetermined value, and it is not necessary to find the fuel injection amount preliminarily.

In the present invention, preferably, the concentration estimating means may be configured to estimate the concentration based on the actual fuel compensation ratio, the first predetermined value and the second predetermined value. In accordance with this configuration, it is possible to estimate the concentration of the alternative fuel in the blended fuel with higher accuracy than a case where the second predetermined value is not considered as shown in FIG. 8 as described later.

In the present invention, preferably, the concentration estimating means may be configured to estimate the concentration Ke of the alternative fuel in the blended fuel, based on the actual fuel compensation ratio Kti, the first predetermined value $\lambda 1_{E0}$ and the second predetermined value $\lambda 2_{E0}$, with reference to a correlation formula:

$$Ke = [a_0\{Kti(\lambda 2_{E0}/\lambda 1_{E0})\}^n + a_1\{Kti(\lambda 2_{E0}/\lambda 1_{E0})\}^{n-1} \ldots a_{n-1}\{Kti(\lambda 2_{E0}/\lambda 1_{E0})\} + a_n] \quad (1)$$

(Ke is the concentration of the alternative fuel of the blended fuel, $a_0, a_1, a_2, \ldots, a_n$ are predetermined coefficients, and n is a predetermined constant).

In accordance with this configuration, the concentration estimating means can estimate the concentration based on the calculated actual fuel compensation ratio Kti, the first predetermined value $\lambda 1_{E0}$, and the second predetermined value $\lambda 2_{E0}$, by referring to the correlation formula (1).

In the present invention, preferably, the air excess ratio control means may be configured to compensate the fuel injection amount of the fuel injection device when the internal combustion engine is idling or driving at a medium to high speed; and the concentration estimating means may be configured to estimate the concentration after the actual fuel compensation ratio calculated by the fuel compensation ratio calculating means is stabilized.

In accordance with this configuration, the concentration of the alternative fuel in the blended fuel is estimated in a state where the internal combustion engine is idling and a state where the engine is driving at a medium to high speed. Since the concentration of the alternative fuel in the blended fuel is estimated in a state where the internal combustion engine is idling, the concentration can be estimated in an initial stage after actuating the internal combustion engine. Since the concentration of the alternative fuel in the blended fuel is estimated in a state where the internal combustion engine is driving at a medium to high speed, the concentration can be estimated when combustion in the internal combustion engine is stable.

In the above configuration, also, the actual fuel compensation ratio calculated by the fuel compensation ratio calculating means is stabilized, and then, the air excess ratio in the combustion chamber is stabilized at the second predetermined value. Since the estimation of the concentration is carried out in a state where the air excess ratio is stabilized at the second predetermined value, the actual fuel compensation ratio is calculated with higher accuracy and the concentration of the alternative fuel in the blended fuel is estimated with higher accuracy, as compared to a case where the air excess ratio is not stabilized.

In the present invention, the alternative fuel concentration estimating system may preferably comprise an engine speed control means for increasing an engine speed of the internal combustion engine; and the engine speed control means may be configured to increase the engine speed when the internal combustion engine is idling and the air excess ratio control means compensates the fuel injection amount of the fuel injection device. In accordance with this configuration, the combustion in the internal combustion engine is stabilized by increasing the engine speed of the internal combustion engine in an idling state by the engine speed control means.

In the present invention, the alternative fuel concentration estimating system may preferably further comprise a fuel increase detecting means for detecting an increase in the blended fuel stored in a storage tank, and the concentration estimating means determines a predetermined reference concentration as the estimated concentration, if the concentration is not estimated and the air excess ratio control means is in a stopped state, after the fuel increase detecting means has detected the increase in the blended fuel.

After the fuel increase detecting means detects the increase in the blended fuel, there is a change in the concentration of the alternative fuel, in many cases. In a case where there is a great difference between the concentration estimated previously and the changed concentration, then combustion in the internal combustion engine tends to be unstable, if the changed concentration of the alternative fuel is left unestimated. In accordance with the above configuration, however, the predetermined reference concentration is regarded as the estimated concentration in a case where the concentration of the alternative fuel cannot be estimated after the concentration has been changed. This makes it possible to prevent the difference between the estimated concentration and the changed concentration from becoming too large. As a result, it is possible to prevent unstable combustion from occurring in the internal combustion engine.

A vehicle of the present invention comprises the above mentioned alternate fuel concentration estimating system; an internal combustion engine which combusts in a combustion chamber, a blended fuel in which an alternative fuel is mixed with a basic fuel; and a fuel injection device in which a predetermined fuel injection amount is preset such that an air excess ratio in the combustion chamber is a first predetermined value other than 1 when a concentration of the alternative fuel in the blended fuel is zero.

In accordance with the vehicle of the present invention, even in the internal combustion engine in which combustion may occur in a state where the air excess ratio in the combustion chamber is the first predetermined value other than 1, the concentration of the alternative fuel in the blended fuel can be estimated by calculating the actual fuel compensation ratio.

An alternative fuel concentration estimating method of the present invention, for estimating a concentration of an alternative fuel in a blended fuel in which the alternative fuel is mixed with a basic fuel, when a predetermined fuel injection amount is preset such that an air excess ratio in the combustion chamber is a first predetermined value other than 1 when a concentration of the alternative fuel in the blended fuel is zero in an internal combustion engine which combusts the blended fuel in the combustion chamber comprises calculating an actual fuel compensation ratio by dividing by the predetermined fuel injection amount, a fuel injection amount having been compensated so that the air excess ratio in the combustion chamber reaches a second predetermined value, based on a concentration of at least one component gas contained in an exhaust gas exhausted from the internal combustion engine, and estimating the concentration based on the calculated actual fuel compensation ratio, the first predetermined value, and the second predetermined value which is an air excess ratio in the combustion chamber when the fuel injection device injects a fuel with the compensated fuel injection amount.

In accordance with the alternative fuel concentration estimating method of the present invention, by using the first predetermined value in addition to the actual fuel compensation ratio calculated, the estimation of the concentration of the alternative fuel in the blended fuel can be initiated while maintaining the air excess ratio at the first predetermined value before compensating the fuel injection amount, in the internal combustion engine in which combustion occurs in a state where the air excess ratio in the combustion chamber is other than 1 and is not the theoretical air-fuel ratio. Therefore, unlike the conventional technique, it is not necessary to set the air excess ratio in the combustion chamber to 1 before compensating the fuel injection amount, the number of steps for estimating the concentration is reduced, and the concentration can be easily estimated. In the conventional technique, it is necessary to execute the $O_2$ feedback control when the concentration of the alternative fuel in the blended fuel is zero to preliminarily find the fuel injection amount with which the air excess ratio is 1. However, in the present invention, the concentration of the alternative fuel in the blended fuel can be estimated by referring to the first predetermined value and the second predetermined value, and it is not necessary to find the fuel injection amount preliminarily.

An alternative fuel concentration estimating system of the present invention is an alternative fuel concentration estimating system, which is applied to an object including an internal combustion engine which combusts in a combustion chamber, a blended fuel in which an alternative fuel is mixed with a basic fuel, and a fuel injection device in which a predetermined fuel injection amount is preset such that an air excess ratio in the combustion chamber is 1 or a first predetermined value other than 1 when a concentration of the alternative fuel in the blended fuel is zero. The system comprises an air excess ratio control means for compensating a fuel injection amount of the fuel injection device so that the air excess ratio in the combustion chamber reaches a second predetermined value, based on a concentration of at least one component gas contained in an exhaust gas which is derived from an output value of an exhaust gas sensor provided in an exhaust system of the internal combustion engine, a fuel compensation ratio calculating means for calculating an actual fuel compensation ratio by dividing by the predetermined fuel injection amount, the fuel injection amount having been compensated so that the air excess ratio in the combustion chamber reaches the second predetermined value, based on the concentration of the component gas, and a concentration estimating means for estimating the concentration based on the actual fuel compensation ratio calculated by the fuel compensation ratio calculating means, the first predetermined value, and the second predetermined value.

In accordance with the present invention, it is possible to provide an alternative fuel concentration calculating system capable of calculating the concentration of the alternative fuel in the blended fuel with higher accuracy than in a case where the concentration of the alternative fuel is calculated by referring to only the first predetermined value, even when compensating the fuel injection amount of the fuel injection device so that the air excess ratio in the combustion chamber reaches the second predetermined value.

Advantageous Effects of the Invention

In accordance with the present invention, the calculation of the alternative fuel in the blended fuel can be initiated while maintaining the air excess ratio at the first predetermined value before compensating the fuel injection amount, in the internal combustion engine in which combustion occurs in a state where the air excess ratio in the combustion chamber is a predetermined value.

In addition, in accordance with the present invention, the concentration of the alternative fuel in the blended fuel can be calculated with high accuracy, even when compensating the fuel injection amount of the fuel injection device so that the air excess ratio in the combustion chamber reaches the second predetermined value, based on the concentration of at least one component gas contained in the exhaust gas which is derived from an output value of an exhaust gas sensor provided in an exhaust system of the internal combustion engine which combusts the blended fuel.

DESCRIPTION OF THE EMBODIMENT

Hereinafter, an embodiment of the present invention will be described with reference to the drawings.

[Motorcycle]

Figure 1:
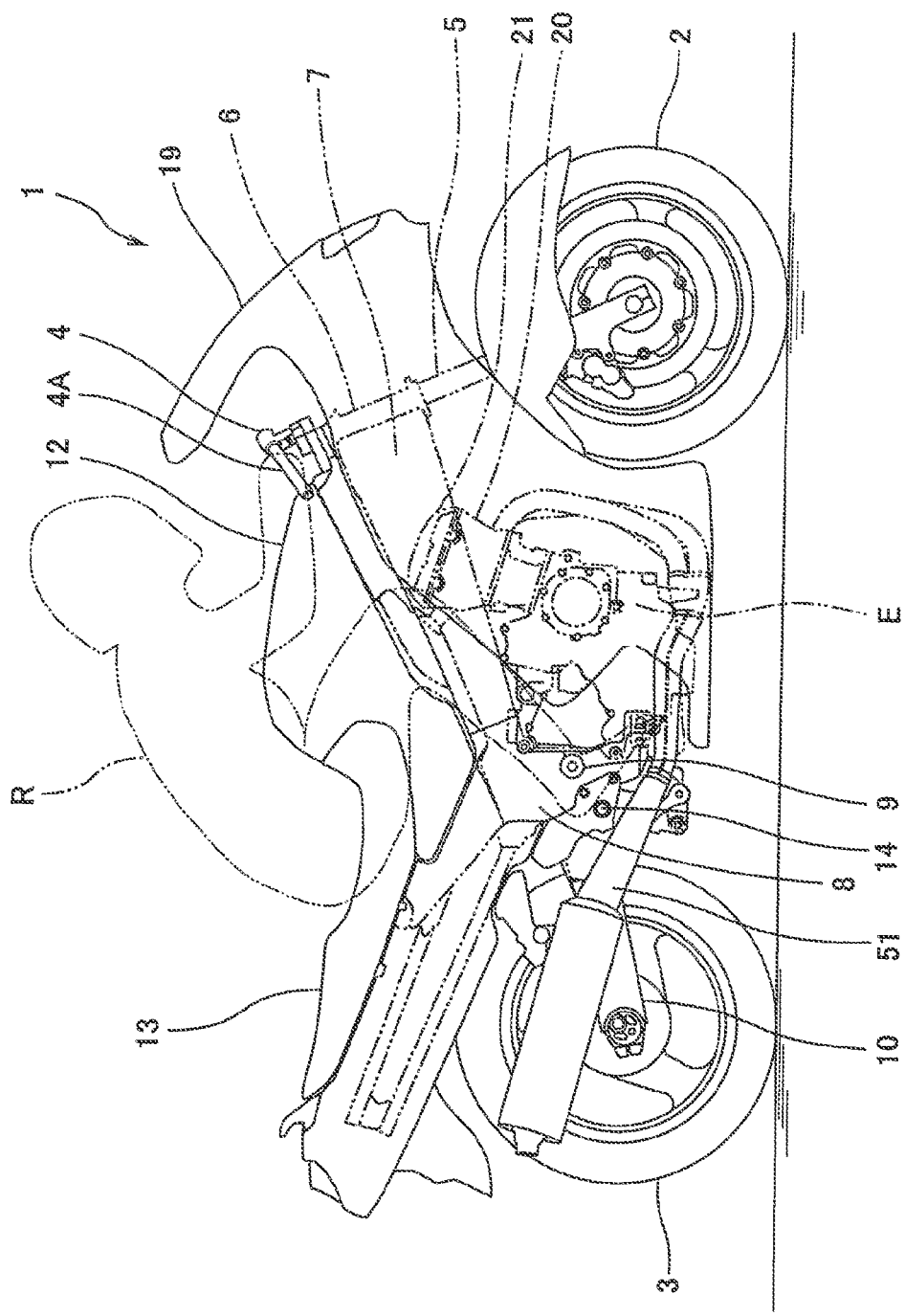
FIG. 1 is a right side view of a motorcycle according to an embodiment of the present invention, showing a motorcycle of a road sport type which is straddled by a rider with an upper body tilted forward.

FIG. 1 is a right side view of a motorcycle 1 according to an embodiment of the present invention, showing the motorcycle 1 of a road sport type which is straddled by a rider with an upper body tilted forward. In the embodiment, hereinafter, the stated directions are referenced from the rider R straddling the motorcycle 1.

As shown in FIG. 1, the motorcycle 1 includes a front wheel 2 and a rear wheel 3. The front wheel 2 is rotatably mounted to a lower portion of a front fork 5 extending substantially vertically. The front fork 5 is mounted to a steering shaft which is not shown via an upper bracket which is not shown and is provided at an upper end portion thereof and an under bracket provided below the upper bracket. The steering shaft is rotatably supported by a head pipe 6. A bar-type steering handle 4 extending in a rightward and leftward direction is attached to the upper bracket. The rider R rotates the steering handle 4 to turn the front wheel 2 in a desired direction around the steering shaft.

A pair of right and left main frames 7, forming a frame of a vehicle body, extend rearward from the head pipe 6. Pivot frames 8 extend downward from rear portions of the main frames 7, respectively. Swing arms 10 are pivotally mounted at front end portions to pivots 9 provided to the pivot frames 8, respectively. The rear wheel 3 is rotatably mounted to rear end portions of the swing arms 10.

A fuel tank 12 is disposed above the main frames 7 and behind the steering handle 4. A straddle-type seat 13 is provided behind the fuel tank 12. An engine E is mounted in a space below the right and left main frames 7. The engine E is an inline four-cylinder four-cycle engine. As described later, the engine E is an overhead camshaft (DOHC) engine including an intake cam 30 and an exhaust cam 31 inside a cylinder head 20 as described later (see FIG. 2). A driving power of the engine E is transmitted to the rear wheel 3 via a transmission and a chain which are not shown, and the rear wheel 3 is driven to rotate. In this way, a propulsive force is generated in the motorcycle 1.

A cowling 19 is integrally provided to cover a front portion of the motorcycle 1, i.e., the head pipe 6, a front portion of the main frames 7, and side portions of the engine E. The rider R straddles the seat 13 and rides in the motorcycle 1. The rider R drives the motorcycle 1, gripping an accelerator grip 4A rotatably attached to an end portion of the steering handle 4 and putting the rider R's feet on right and left steps 14 provided in the vicinity of a rear portion of the engine E. In front of the left step 14, a change pedal which can switch a transmission gear position is provided.

[Engine]

Figure 2:
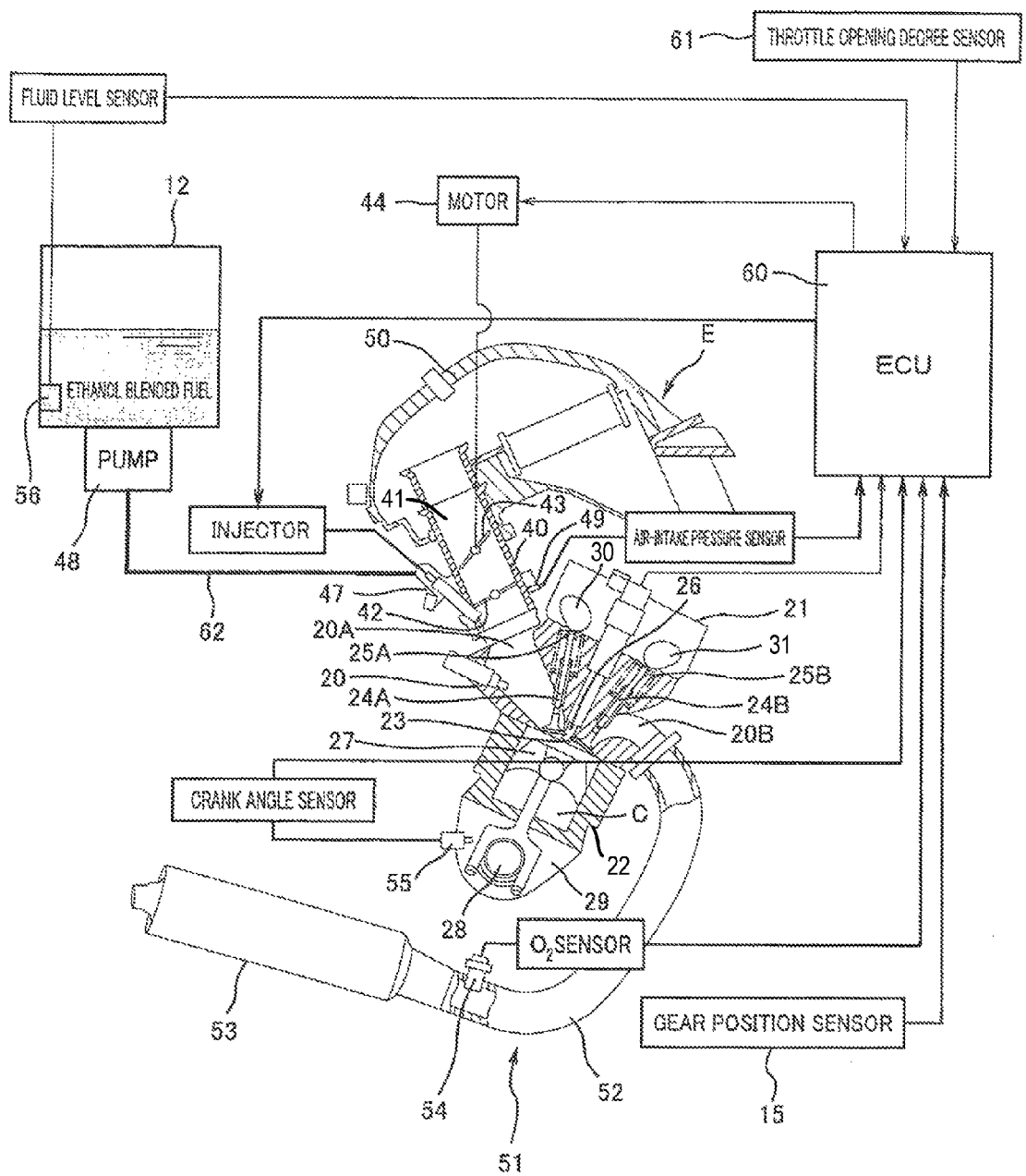
FIG. 2 is a right side view schematically showing the engine of FIG. 1 in an enlarged manner.

FIG. 2 is a right side view schematically showing the engine E of FIG. 1 in an enlarged manner. Hereinafter, the engine E will be explained with reference to FIGS. 1 and 2. The engine E operates by combusting a blended fuel in which ethanol which is an alternative fuel of gasoline is blended with the gasoline which is a basic fuel. In this embodiment, it is assumed that a fuel of 100% gasoline and a fuel of 100% ethanol are included in the blended fuel.

The engine E includes four cylinders C and is tilted forward by a predetermined angle as shown in FIGS. 1 and 2. The engine E includes the cylinder head 20, a cylinder head cover 21, and a cylinder block 22 as basic components. Four combustion chambers 23 are formed at a lower portion of the cylinder head 20 and are coupled to cylinders C, respectively. Four intake ports 20A are formed in a rear portion of the cylinder head 20 and are coupled to the combustion chambers 23, respectively. Four exhaust ports 20B are formed at a front portion of the cylinder head 20 and are coupled to the combustion chambers 23, respectively.

The cylinder head 20 is provided with ignition plugs 26, four intake valves 24A and four exhaust valves 24B. A tip end of each ignition plug 26 protrudes into the combustion chamber 23 and is configured to ignite an air-fuel mixture supplied to the combustion chamber 23. The four intake valves 24A are configured to open and close the intake ports 20A, respectively, while the four exhaust valves 24B are configured to open and close the exhaust ports 20B, respectively.

At an upper portion of the cylinder head 20, an intake camshaft and an exhaust camshaft are rotatably provided. Four intake cams 30 are integrally provided at the intake camshaft to correspond to the intake valves 24A, respectively. Each intake cam 30 is in contact with a cotter 25A provided at the corresponding intake valve 24A. When the intake camshaft rotates, each intake valve 24A moves up and down to open and close the corresponding intake port 20A. Four exhaust cams 31 are integrally provided at the exhaust camshaft to correspond to the exhaust valves 24B, respectively. Each exhaust cam 31 is in contact with a cotter 25B provided at the corresponding exhaust valve 24B. When the exhaust camshaft rotates, each exhaust valve 24B moves up and down to open and close the corresponding exhaust port 20B.

A cam holder is disposed at an upper portion of the cylinder head 20 to cover the intake camshaft and the exhaust camshaft. The intake camshaft and the exhaust camshaft are sandwiched between the upper portion of the cylinder head 20 and a lower portion of the cam holder and are rotatably held. The cylinder head cover 21 covers the cam holder from above. The cylinder head cover 21 is fastened to the upper portion of the cylinder head 20.

The cylinder block 22 having the four cylinders C is provided at a lower portion of the cylinder head 20. The cylinder block 22 is disposed at a lower portion of the cylinder head 20 such that the cylinders C are coupled to the corresponding combustion chambers 23, respectively. A piston 27 is accommodated into each cylinder C. A crankcase 29 is provided at a lower portion of the cylinder block 22 to accommodate a crankshaft 28 extending in a vehicle width direction. The crankcase 29 is attached with a crank angle sensor 55 for transmitting an output according to a crank angle of the crankshaft 28.

A chain tunnel which is not shown is formed to penetrate the crankcase 29, the cylinder block 22 and the cylinder head 20. A rotation transmission mechanism is accommodated into the chain tunnel to rotate the crankshaft 28, the intake camshaft and the exhaust camshaft in association with each other. The rotation transmission mechanism includes a crank cam sprocket fastened to the crankshaft 28, an intake cam sprocket fastened to the intake camshaft, and a cam sprocket fastened to the exhaust camshaft. A timing chain is installed around these three sprockets.

A throttle body 40 is provided upstream of the cylinder head 20. The throttle body 40 is provided with air-intake passages 41 corresponding to the intake ports 20A, respectively. Two throttle valves, upstream valve 42 and downstream valve 43 are provided in each air-intake passage 41. The upstream throttle valve 43 is driven by a motor 44 to open and close the air-intake passage 41. The downstream throttle valve 42 is coupled to the accelerator grip 4A via a wire which is not shown and configured to open and close the air-intake passage 41 according to the rotation of the accelerator grip 4A. An injector 47 is provided in the throttle body 40. The injector 47 is coupled to the fuel tank 12 for storing the blended fuel via a fuel pump 48.

The injector 47 is configured to inject the blended fuel supplied by the fuel pump 48 into the air-intake passage 41. The throttle body 40 is attached with an air-intake pressure sensor 49 downstream of the throttle valves 42 and 43 in the air-intake passage 41. The air-intake pressure sensor 49 is configured to transmit an output according to an air-intake pressure of the air-intake passage 41. The throttle body 40 is coupled to an air cleaner 50.

A muffler 51 is provided downstream of the cylinder head 20. The muffler 51 includes an exhaust manifold unit 52 and a silencer unit 53. The exhaust manifold unit 52 has four ports coupled to the exhaust ports 20B, respectively. The four ports are collected into one port which is coupled to the silencer unit 53. The exhaust manifold unit 52 is attached with an $O_2$ sensor 54 at the one port of the collected four ports. The $O_2$ sensor 54 is configured to transmit an output according to an amount of $O_2$ contained in the exhaust gas.

The fuel tank 12 is attached with a fluid level sensor 56 for transmitting an output according to a fluid level of the alternative fuel stored in the fuel tank 12. The motorcycle 1 is attached with a gear position sensor 15 for transmitting an output according to the transmission gear position.

[ECU]

The $O_2$ sensor 54, the gear position sensor 15, the air-intake pressure sensor 49, the crank angle sensor 55 and the fluid level sensor 56 are electrically coupled to the ECU 60. The ECU 60 is configured to calculate the transmission gear position, a concentration of $O_2$ contained in the exhaust gas, the air-intake pressure in the air-intake passage 41, an engine speed, and a fluid level inside the fuel tank 12, based on the outputs of the sensors 15, 49, 54, 55 and 56.

Furthermore, the ECU 60 is electrically coupled to a throttle opening degree sensor 61. The throttle opening degree sensor 61 is configured to transmit an angular displacement amount of the accelerator grip 4A, i.e., an output according to a throttle opening degree, to the ECU 60. The ECU 60 drives the motor 44 according to the output of the throttle opening degree sensor 61 to control an opening degree of the throttle valve 43. The ECU 60 is electrically coupled to the injector 47 and is configured to control an amount of the fuel injected from the injector 47.

The ECU 60 contains a fuel map. In this fuel map, predetermined fuel injection amounts correspond to the air-intake pressures in the air-intake passage 41 and to the engine speeds, respectively. The predetermined fuel injection amount is set so that an air excess ratio in the combustion chamber 23 is a value less than 1 when the ethanol concentration is 0%, i.e., the gasoline is 100%. Each predetermined fuel injection amount in the fuel map is adjusted according to the ethanol concentration of the blended fuel. For example, each predetermined fuel injection amount in the fuel map is adjusted, for example, by multiplying each fuel injection amount in the fuel map by an adjustment coefficient determined according to the ethanol concentration.

Figure 3:
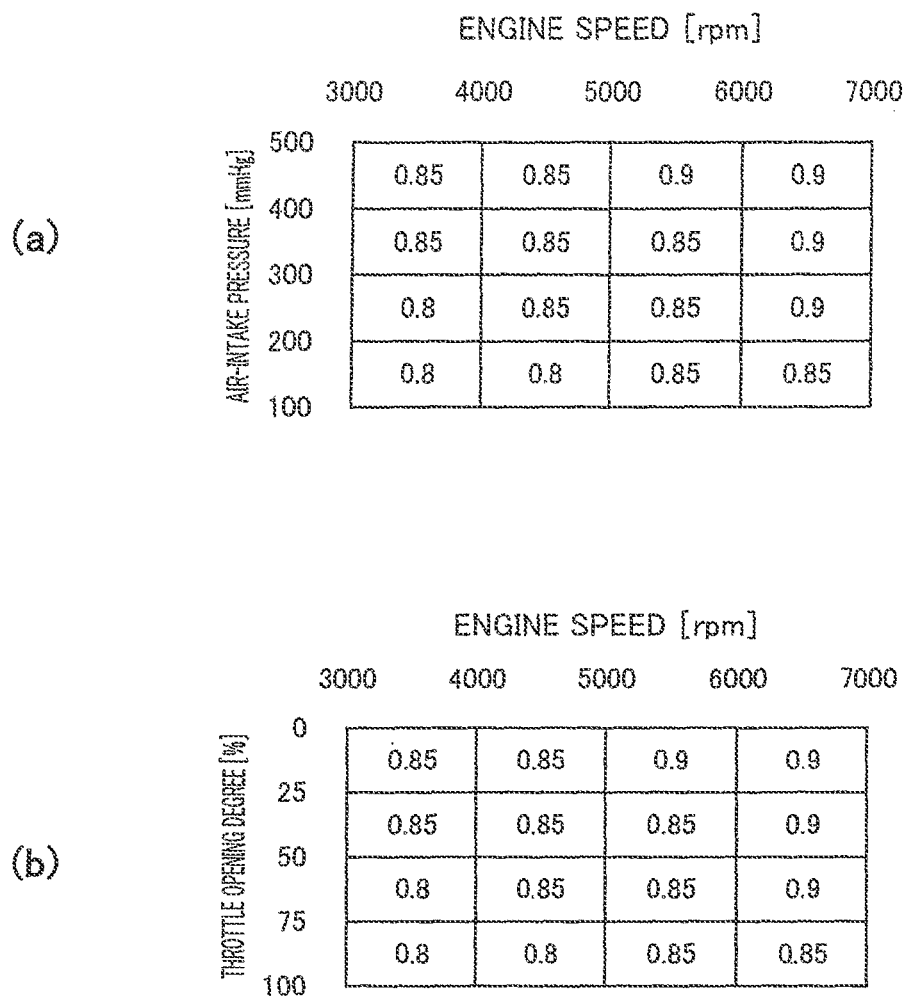
FIG. 3(a) is a view showing a first air excess ratio map and FIG. 3(b) is a view showing a second air excess ratio map.

FIG. 3(a) is a view showing a first air excess ratio map and FIG. 3(b) is a view showing a second air excess ratio map. The ECU 60 contains two air excess ratio maps as shown in FIG. 3. In the first air excess ratio map, first predetermined values which are less than 1 and are air excess ratios in the combustion chamber 23 measured when the blended fuel with the ethanol concentration of 0%, i.e., with 100% gasoline, is injected from the injector 47 with respective fuel injection amounts, correspond to the air-intake pressures in the air-intake passage 41 and the engine speeds, respectively, at the time of measurement. In the second air excess ratio map, the first predetermined values which are less than 1 and are air excess ratios in the combustion chamber 23 measured when the blended fuel with the ethanol concentration of 0%, i.e., with 100% gasoline, is injected from the injector 47, correspond to the throttle opening degrees and the engine speeds, respectively, at the time of measurement.

Figure 4:
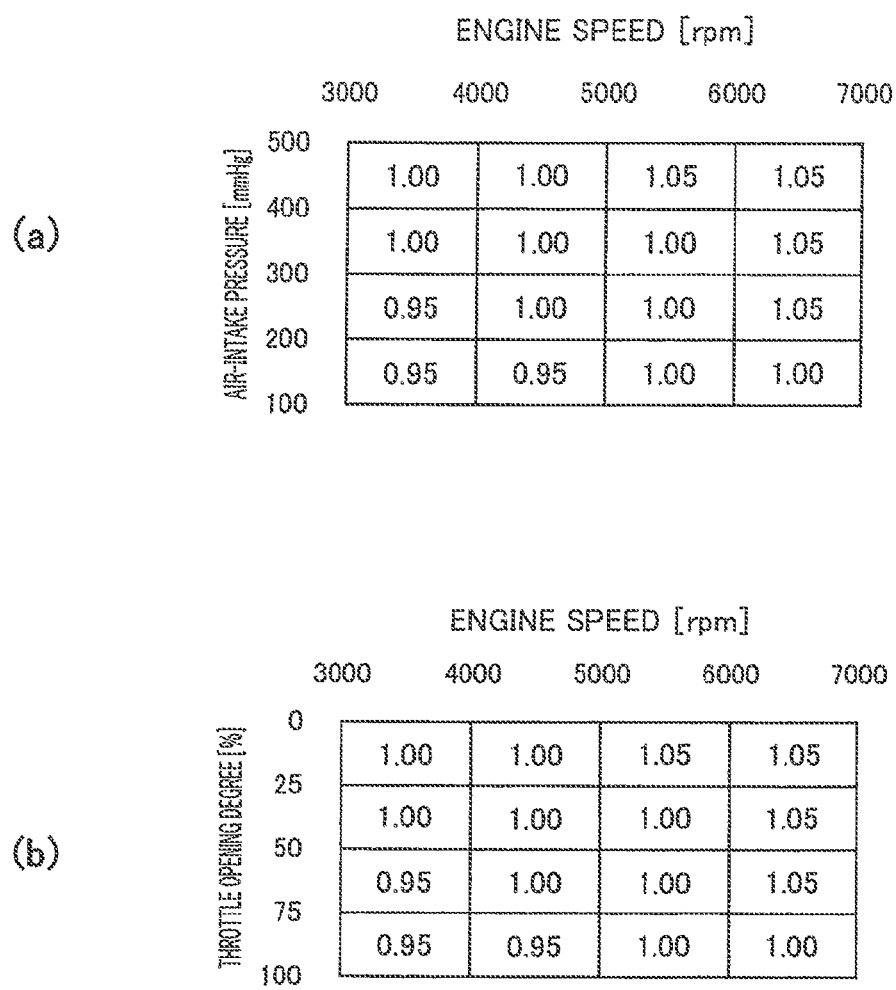
FIG. 4(a) is a view showing a third air excess ratio map and FIG. 4(b) is a view showing a fourth air excess ratio map.

FIG. 4(a) is a view showing a third air excess ratio map and FIG. 4(b) is a view showing a fourth air excess ratio map. The ECU 60 further contains two air excess ratio maps as shown in FIG. 4. The ECU 60 is configured to perform $O_2$ feedback control as described later. In the third air excess ratio map, second predetermined values which are target values of the air excess ratio in the combustion chamber 23 during the $O_2$ feedback control correspond to the air-intake pressures in the air-intake passage 41 and the engine speeds, respectively. In the fourth air excess ratio map, the second predetermined values which are target values of the air excess ratio in the combustion chamber 23 during the $O_2$ feedback control correspond to the throttle opening degrees and to the engine speeds, respectively. Each of the second predetermined values listed in the third air excess ratio map and the fourth air excess ratio map are closer to 1 than each first predetermined value. Each second predetermined value is 1 or close to 1.

[Operation of ECU]

When the rider rotates the accelerator grip 4A, the downstream throttle valve 42 opens the air-intake passage 41 according to the rotation of the accelerator grip 4A. Concurrently with this, the ECU 60 drives the motor 44 according to the output of the throttle opening degree sensor 61 to control the opening degree of the upstream throttle valve 43. The ECU 60 calculates the air-intake pressure in the air-intake passage 41, the engine speed and the throttle opening degree based on the outputs of the sensors 49, 55 and 61. The ECU 60 determines the predetermined fuel injection amount based on the calculated air-intake passage in the air-intake passage 41 and the calculated engine speed, with reference to the fuel map which is not shown. The ECU 60 causes the injector 47 to inject the fuel with the decided fuel injection amount.

A gas mixture of the blended fuel injected from the injector 47 and air flowing through the air-intake passage 41 is supplied to the combustion chamber 23 via the intake port 20A. The intake valve 24A closes the intake port 20A. The ECU 60 causes the ignition plug 26 to perform ignition to combust the gas mixture in the combustion chamber 23. Thereby, the piston 27 is pressed down and the crankshaft 28 rotates. According to the rotation, the exhaust valve 24B moves to open the exhaust port 20B, so that an exhaust gas is exhausted to atmosphere through the muffler 51. The output according to the amount of $O_2$ contained in the exhaust gas is sent from the $O_2$ sensor 54 to the ECU 60. The ECU 60 calculates the concentration of $O_2$ contained in the exhaust gas based on the output.

As described above, the predetermined fuel injection amount is set so that the air excess ratio in the combustion chamber 23 is the first predetermined value which is less than 1. Therefore, the engine E basically operates under a state where an air-intake amount is less than that of a theoretical air-fuel ratio, i.e., fuel-rich state in which the amount of the blended fuel is great.

The ECU 60 performs the $O_2$ feedback control during idling of the motorcycle 1, driving at a medium to high speed at a constant speed, driving at a medium to high speed in a gradually accelerated state, or driving at a medium to high speed in a gradually decelerated state. Driving at a medium to high speed refers to a state where the motorcycle 1 is driving within a range in which the engine speed is not less than 3000 rpm and not more than 8000 rpm, and in a range in which the speed is not less than 40 km/hr and not more than 150 km/hr. Hereinafter, the $O_2$ feedback control performed by the ECU 60 will be described in more detail.

The ECU 60 determines whether or not the engine speed, the air-intake pressure and the throttle opening degree correspond to driving at a medium to high speed at a constant speed, driving at a medium to high speed in a gradually accelerated state or driving at a medium to high speed in a gradually decelerated state, based on the outputs of the sensors 49, 61 and 55. During this determination, the ECU 60 determines whether or not the air excess ratio in the combustion chamber 23 is a second predetermined value which is a target value, based on the $O_2$ concentration calculated based on the output of the $O_2$ sensor 54. The second predetermined value is decided based on the calculated air-intake pressure in the air-intake passage 41, the calculated engine speed and the calculated throttle opening degree, with reference to the third and fourth air excess ratio maps.

If it is determined that the air excess ratio is not the second predetermined value, the ECU 60 increases or decreases the fuel injection amount of the injector 47 by a predetermined amount to compensate the air excess ratio in the combustion chamber 23. Then, the ECU 60 determines again whether or not the air excess ratio in the combustion chamber 23 is the second predetermined value based on the $O_2$ concentration calculated. The ECU 60 repeats this step until the air excess ratio in the combustion chamber 23 reaches the second predetermined value. When the air excess ratio reaches the second predetermined value, the ECU 60 calculates an actual fuel compensation ratio by dividing a fuel injection amount at this time point by a predetermined fuel injection amount before the $O_2$ feedback control. In other words, the ECU 60 calculates an actual fuel compensation ratio by dividing a fuel injection amount after the air excess ratio in the combustion chamber 23 has been compensated into the second predetermined value, by the predetermined fuel injection amount.

An octane number of the blended fuel changes and a predetermined fuel injection amount of the fuel to be injected changes according to a change in the ethanol concentration of the blended fuel. According to these changes, a driving power of the engine E changes. For this reason, if the ethanol concentration of the blended fuel is not estimated preliminarily and a changing of the settings of the ECU 60 based on the estimated ethanol concentration is not performed, a desired driving power cannot be generated in the engine E. Therefore, the ECU 60, which is the alternate fuel concentration estimating system, is configured to estimate the ethanol concentration of the blended fuel. Hereinafter, a method of estimating the ethanol concentration of the blended fuel will be described in detail.

[Estimation of Ethanol Concentration]

Figure 5:
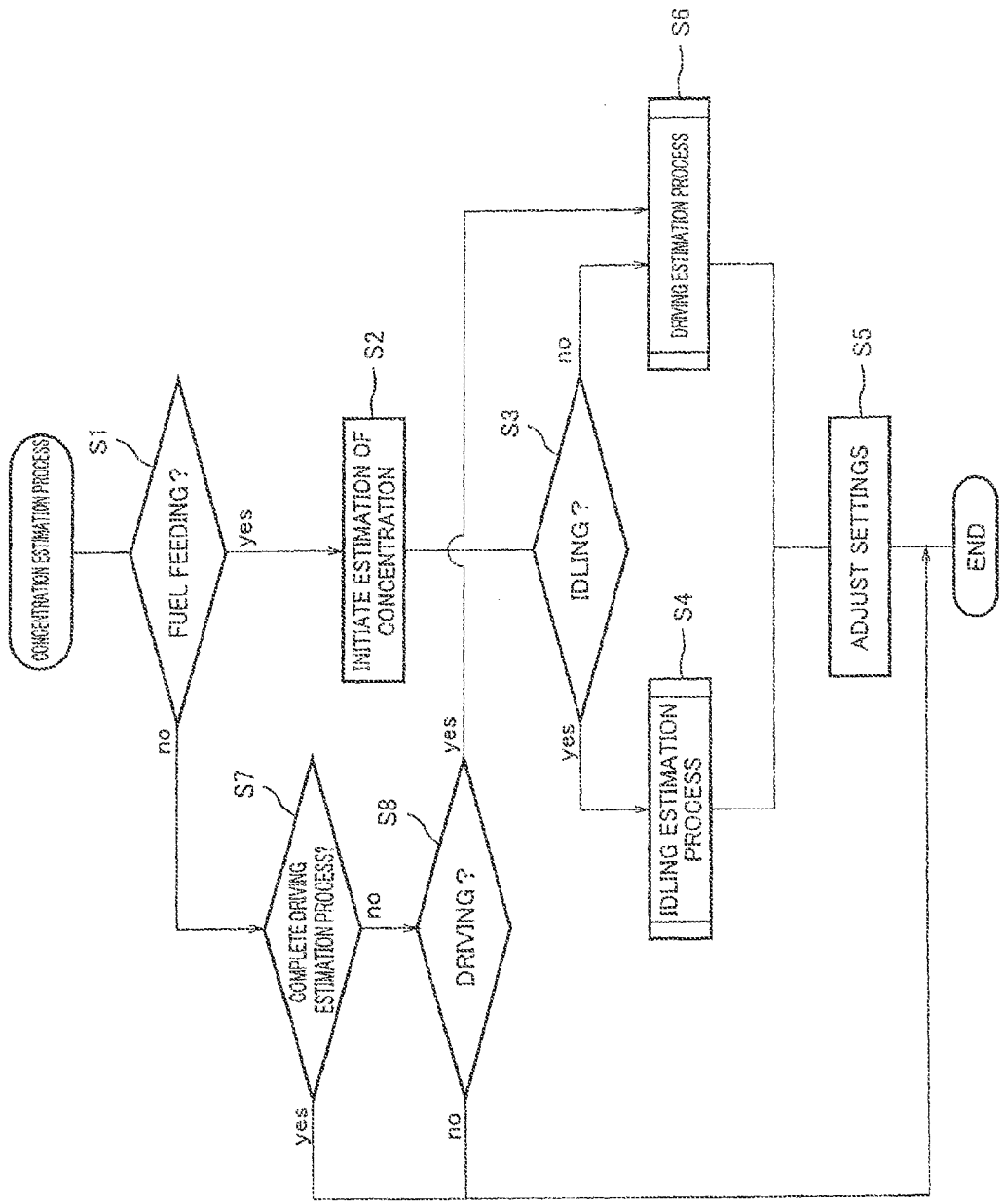
FIG. 5 is a flowchart showing a procedure of a concentration estimation process performed when an ECU estimates an ethanol concentration of a blended fuel.

FIG. 5 is a flowchart showing a procedure of a concentration estimation process performed when the ECU 60 estimates the ethanol concentration of the blended fuel. In the concentration estimation process as described below, an operation is performed mainly by the ECU 60, but a subject of the operation is sometimes omitted for the sake of convenience of explanation.

The concentration estimation process is initiated when the rider turns on a main key of the motorcycle 1, and the process moves to step S1. In step S1, it is determined whether or not fuel feeding has occurred. It is determined whether or not fuel feeding has occurred, based on a change in the fluid level in the fuel tank 12 which is calculated based on the output of the fluid level sensor 56. If it is determined that there is a change, it is determined that fuel feeding has occurred, while if it is determined that there is no change, it is determined that no fuel feeding has occurred. If it is determined that fuel feeding has occurred, the process moves to step S2

In step S2, to initiate estimation of the ethanol concentration, the ECU 60 executes a program for estimating the ethanol concentration. Upon the start of the program, the process moves to step S3. In step S3, it is determined whether or not the engine E is idling. It is determined whether or not the engine E is idling, based on whether or not the transmission gear position is neutral based on the output of the gear position sensor 15. If the transmission gear position is neutral, it is determined that the engine E is idling. On the other hand, if the transmission gear position is not neutral, it is determined that the engine E is not idling, i.e., the engine 1 is driving. If it is determined that the engine E is idling, the process moves to step S4.

Figure 6:
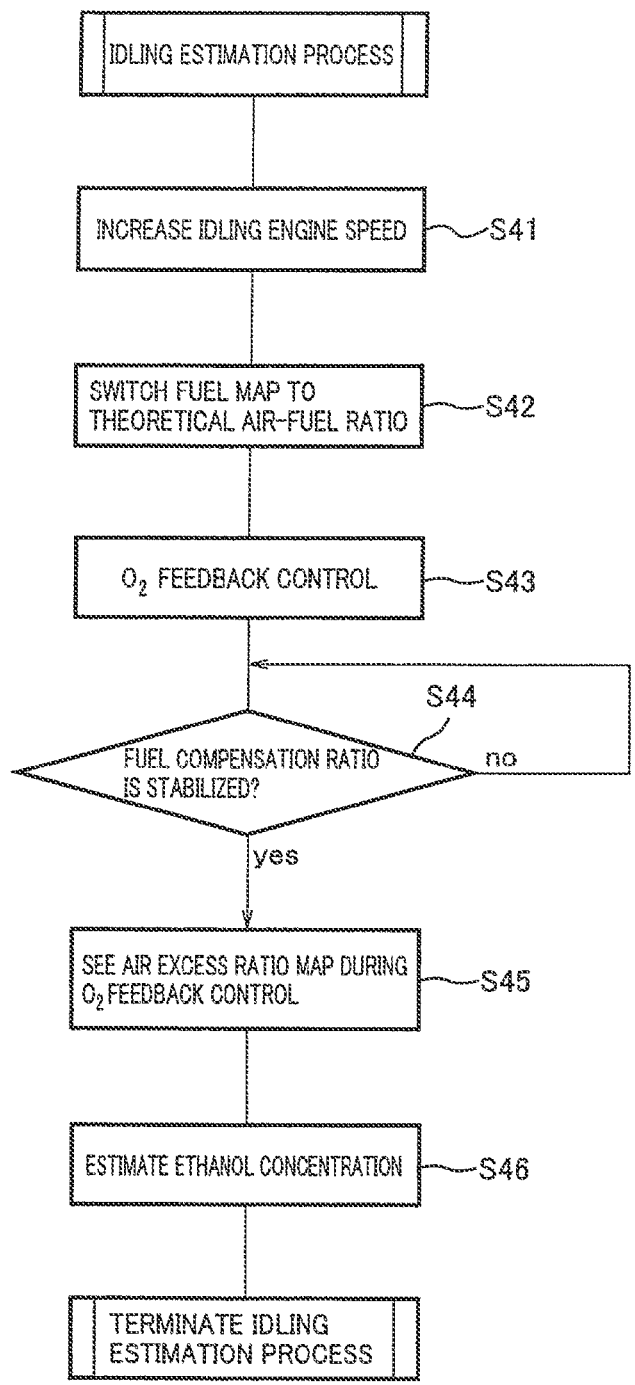
FIG. 6 is a flowchart showing a procedure of an idling concentration estimation process performed when the ECU estimates the ethanol concentration during an idling state.

FIG. 6 is a flowchart showing a procedure of an idling concentration estimation process performed when the ECU 60 estimates the ethanol concentration during an idling state. In step S4, the idling concentration estimation process is performed, and the process moves to step S41. In step S41, the ECU 60 increases the engine speed by the predetermined engine speed, i.e., increases an idling engine speed by a predetermined engine speed, i.e., several hundred rpm. This makes the engine speed stable and makes it possible to prevent the driving power from reducing significantly and the engine E from stopping even if the fuel map is switched to a theoretical air-fuel ratio. Since the engine speed is stable, an error of the estimated ethanol concentration can be reduced. After the engine speed is increased, the process moves to step S42.

In step 42, each predetermined fuel injection amount in the ECU 60 is switched to a fuel injection amount with which the air excess ratio in the combustion chamber 23 is 1 when the fuel is 100% gasoline, i.e., the fuel map which is not shown is switched to theoretical air-fuel ratio. The ECU 60 decides the fuel injection amount based on the air-intake pressure in the air-intake passage 41 and the engine speed with reference to the fuel map after the switching. Then, the ECU 60 causes the injector 47 to inject the fuel with the decided fuel injection amount. Then, the process moves to step S43 while maintaining a state where the fuel map, which is not shown, is the theoretical air-fuel ratio. In step S43, the ECU 60 initiates the $O_2$ feedback control. Upon the $O_2$ feedback control being initiated, the process moves to step S44.

In step S44, it is determined whether or not an actual fuel compensation ratio calculated in the $O_2$ feedback control is stabilized. If the fuel mixture with the ethanol concentration before the fuel feeding remains in a tube 62 connecting the fuel pump 48 to the injector 47, the actual fuel compensation ratio is not stable and inconstant. For this reason, in step S44, it is determined repetitively whether or not the actual fuel compensation ratio is stabilized until it is stabilized. Since the ECU 60 awaits until the actual fuel compensation ratio is stabilized, it can estimate the ethanol concentration later with higher accuracy. When the actual fuel compensation ratio is stabilized, the process moves to step S45.

In step S45, initially, the ECU 60 calculates the engine speed, the air-intake pressure in the air-intake passage 41 and the throttle opening degree after the actual fuel compensation ratio is stabilized, based on the outputs of the sensors 49, 55 and 61. Then, the ECU 60 selects either one of or both of the third and fourth air excess ratio maps according to a predetermined condition, for example, a magnitude of the throttle opening degree.

If the ECU 60 selects either one of the third and fourth air excess ratio maps, the ECU 60 selects a second predetermined value $\lambda 2_{E0}$ according to the calculated air-intake pressure in the air-intake passage 41, the calculated throttle opening degree, and the calculated engine speed, with reference to the selected one of the third and fourth air excess ratio maps. If the ECU 60 selects both of the third and fourth air excess ratio maps, the ECU 60 selects a second predetermined value $\lambda 2_{E0}$, according to the calculated air-intake pressure in the air-intake passage 41, the calculated throttle opening degree, and the calculated engine speed, with reference to each of the third and fourth air excess ratio maps. The selected two second predetermined values $\lambda 2_{E0}$ are added with a predetermined ratio to obtain a second predetermined value $\lambda 2_{E0}$. In this embodiment, the second predetermined value $\lambda 2_{E0}$ obtained by addition is treated as being stored in the ECU 60. When the second predetermined value $\lambda 2_{E0}$ is selected, the process moves to step S46.

In step S46, the ECU 60 estimates an ethanol concentration Ke of the blended fuel based on an actual fuel compensation ratio Kti after the actual fuel compensation ratio is stabilized, and the second predetermined values $\lambda 2_{E0}$ selected in step S45. To be specific, the ECU 60 estimates the ethanol concentration Ke of the blended fuel, with reference to a correlation formula (1) showing a relationship between the actual fuel compensation ratio Kti after the actual fuel compensation ratio is stabilized and the ethanol concentration Ke:

$$Ke = [a_0\{Kti(\lambda 2_{E0}/\lambda 1_{E0})^n\} + a_1\{Kti(\lambda 2_{E0}/\lambda 1_{E0})^{n-1}\} \ldots a_{n-1}\{Kti(\lambda 2_{E0}/\lambda 1_{E0})\} + a_n] \quad (1)$$

in this embodiment, with reference to a correlation formula (2):

$$Ke = [a_0\{Kti(\lambda 2_{E0}/\lambda 1_{E0})^2\} + a_1\{Kti(\lambda 2_{E0}/\lambda 1_{E0})\} + a_2] \quad (2)$$

$a_0, a_1, a_2, \ldots, a_n$ are predetermined coefficients, and n is a predetermined constant. In more detail, the ECU 60 estimates an ethanol concentration Ke of the blended fuel, substantially with reference to a correlation formula (3) formed by assigning 1 to the first predetermined value $\lambda 1_{E0}$ because the fuel map has been switched to the theoretical air-fuel ratio in step S42:

$$Ke = \{a_0(Kti\lambda 2_{E0}^2) + a_1(Kti\lambda 2_{E0}) + a_2\} \quad (3)$$

The ECU 60 estimates the ethanol concentration Ke based on the actual fuel compensation ratio Kti after the actual fuel compensation ratio is stabilized, and the second predetermined value $\lambda 2_{E0}$ selected in step S45, with reference to the correlation formula (3).

As described above, in the motorcycle 1, estimation of the ethanol concentration is performed by the $O_2$ feedback control, during idling when the $O_2$ feedback control is not typically performed. This increases an opportunity of estimation of the ethanol concentration. When estimation of the ethanol concentration is accomplished, the idling estimation process terminates.

Turning back to FIG. 5, when the idling estimation process terminates, the process moves to step S5. In step S5, settings in the ECU 60 relating to the engine E are adjusted based on the estimated ethanol concentration. The settings are, for example, an adjustment coefficient according to the ethanol concentration, and an ignition timing of the ignition plug 26. By adjusting the settings, the engine E can generate a desired driving power. When adjustment of the settings is accomplished, the concentration estimation process terminates.

Figure 7:
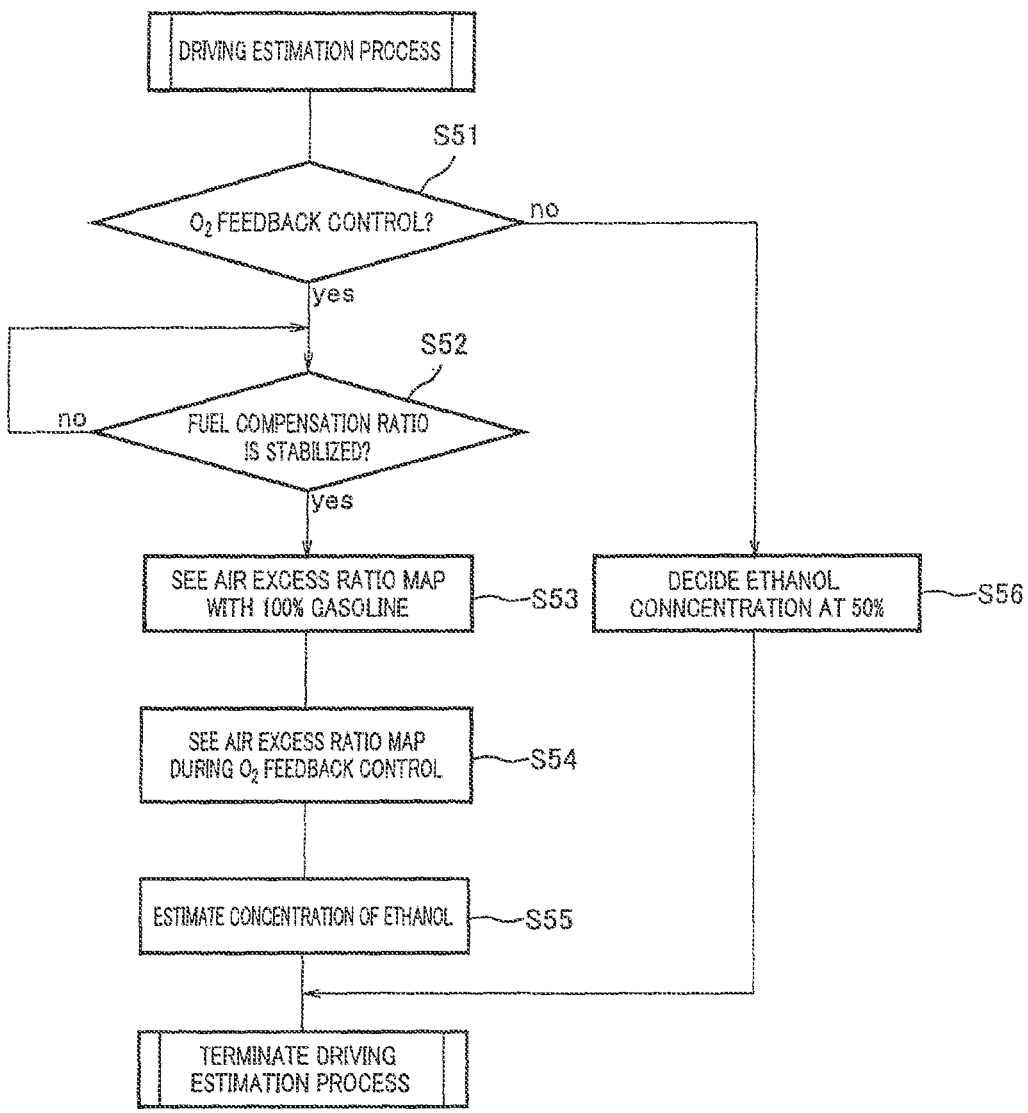
FIG. 7 is a flowchart showing a procedure of a driving concentration estimation process performed when the ECU estimates the ethanol concentration during driving.
Figure 8:
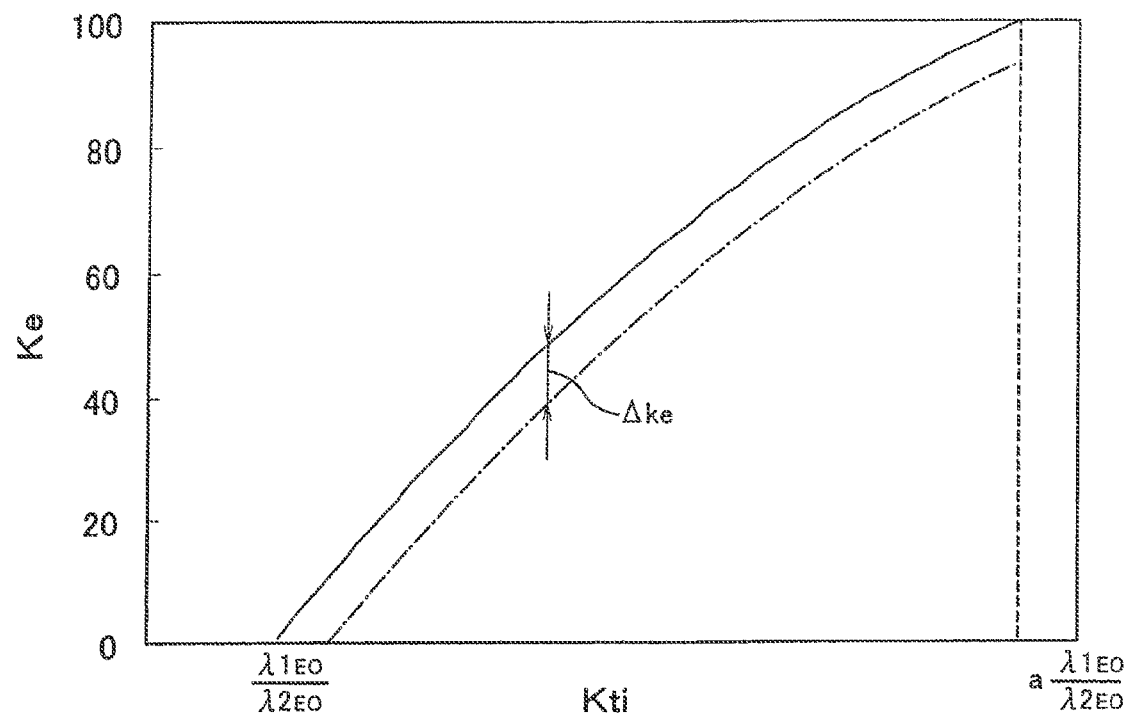
FIG. 8 is a graph showing a relationship between the ethanol concentration Ke of the blended fuel and an actual fuel compensation ratio Kti.

If it is determined that the engine E is driving and therefore is not idling, in step S3, the process moves to step S6. FIG. 7 is a flowchart showing a procedure of a driving concentration estimation process performed when the ECU 60 estimates the ethanol concentration during driving. FIG. 8 is a graph showing a relationship between the ethanol concentration Ke of the blended fuel and the actual fuel compensation ratio Kti. A vertical axis indicates the ethanol concentration Ke (%) and a horizontal axis indicates the actual fuel compensation ratio Kti. In FIG. 8, a solid line indicates a relationship formed by calculation according to the estimating method of this embodiment.

In step S6, the driving concentration estimation process is performed, and the process moves to step S51. In step S51, it is determined whether or not the $O_2$ feedback control is being performed. If it is determined that the $O_2$ feedback control is being performed, the process moves to step S52. In step S52, it is determined whether or not the actual fuel compensation ratio calculated in the $O_2$ feedback control is stabilized. If it is determined that the actual fuel compensation ratio is not stabilized, this determination step is repeated until the fuel compensation ratio is stabilized. When the actual fuel compensation ratio is stabilized, the process moves to step S53.

In step S53, the ECU 60 calculates the air-intake pressure in the air-intake passage 41, the engine speed and the throttle opening degree after the air excess ratio in the combustion chamber 23 has been compensated into the second predetermined value, based on the outputs of the sensors 49, 55 and 61. Then, the ECU 60 selects either one of or both of the first and second air excess ratio maps according to a predetermined condition, for example, a magnitude of the throttle opening degree.

If the ECU 60 selects either one of the first and second air excess ratio maps, the ECU 60 selects a first predetermined value $\lambda 1_{E0}$ according to the calculated air-intake pressure in the air-intake passage 41, the calculated throttle opening degree, and the calculated engine speed, with reference to the selected one of the first and second air excess ratio maps. If the ECU 60 selects both of the first and second air excess ratio maps, the ECU 60 selects a first predetermined value $\lambda 1_{E0}$, according to the calculated air-intake pressure in the air-intake passage 41, the calculated throttle opening degree, and the calculated engine speed, with reference to each of the first and second air excess ratio maps. The selected two first predetermined values $\lambda 1_{E0}$ are added with a predetermined ratio to obtain a first predetermined value $\lambda 1_{E0}$. In this embodiment, the first predetermined value $\lambda 1_{E0}$ obtained by addition is treated as being stored in the ECU 60. When the first predetermined value $\lambda 1_{E0}$ is selected, the process moves to step S54. In step S54, the second predetermined value $\lambda 2_{E0}$ is selected, according to the same procedure as the procedure in step S45. When the second predetermined value $\lambda 2_{E0}$ is selected, the process moves to step S55.

In step S55, the ECU 60 estimates the ethanol concentration Ke of the blended fuel based on the actual fuel compensation ratio Kti after the actual fuel compensation ratio is stabilized, the first predetermined value $\lambda 1_{E0}$ and the second predetermined value $\lambda 2_{E0}$. To be specific, the ECU 60 estimates the ethanol concentration Ke of the blended fuel, with reference to the correlation formula (1) showing a relationship between the actual fuel compensation ratio Kti after the actual fuel compensation ratio is stabilized and the ethanol concentration Ke:

$$Ke=[a_1\{Kti(\lambda 2_{E0}/\lambda 1_{E0})\}^n+a_2\{Kti(\lambda 2_{E0}/\lambda 1_{E0})\}^{n-1}\ldots a_{n-1}\{Kti(\lambda 2_{E0}/\lambda 1_{E0})\}+a_n] \quad (1)$$

in this embodiment, with reference to a correlation formula (2):

$$Ke=[a_0\{Kti(\lambda 2_{E0}/\lambda 1_{E0})\}^2+a_1\{Kti(\lambda 2_{E0}/\lambda 1_{E0})\}+a_2] \quad (2)$$

and based on the actual fuel compensation ratio Kti after the actual fuel compensation ratio is stabilized, which is calculated in step S52, the first predetermined value $\lambda 1_{E0}$ selected in step S53, and the second predetermined value $\lambda 2_{E0}$ selected in step S54.

The concentration Ke may be calculated in such a manner that the first predetermined value $\lambda 1_{E0}$, the second predetermined value $\lambda 2_{E0}$, and the actual fuel compensation ratio Kti are assigned to the correlation formula (2), or each term, for example, Kti ($\lambda 2_{E0}/\lambda 1_{E0}$) is calculated preliminarily and each calculated term is assigned to the correlation formula (2). The relationship between the ethanol concentration Ke and the actual fuel compensation ratio Kti which is derived from the correlation formula (2) is indicated by a solid line in FIG. 8. After the estimation of the ethanol concentration is accomplished, the driving estimation process terminates.

If it is determined that the $O_2$ feedback control is not being performed in step S51, the process moves to step S56. In step S56, a predetermined reference concentration is determined as the estimated ethanol concentration of the blended fuel, for example, 50%, and the estimation of the ethanol concentration is accomplished. The reference concentration is a concentration determined to prevent the engine E from failing to operate, due to a fact that a difference between an actual ethanol concentration and the estimated ethanol concentration is too large.

The predetermined reference concentration is determined as the estimated ethanol concentration as described above, to prevent a state where a difference between a previously estimated concentration and a changed concentration becomes too large from continuing for a long time. If the difference between the previously estimated concentration and the changed concentration becomes too large, combustion in the internal combustion engine is sometimes unstable, if the changed concentration of the alternative fuel is left unestimated. By determining the ethanol concentration as the reference concentration, it is possible to prevent the combustion in the internal combustion engine from becoming unstable, and its rotation is stabilized based on the estimated ethanol concentration. When the estimation of the ethanol is accomplished, the driving estimation process terminates.

Turning back to FIG. 5, when the driving estimation process terminates, the process moves to step S5. In step S5, settings in the ECU 60, relating to the engine E, are adjusted based on the estimated ethanol concentration. When adjustment of the settings is accomplished, the concentration estimation process terminates.

If it is determined that there is no fuel feeding in step S1, the process moves to step S7. In step S7, it is determined whether or not the driving estimation process was executed after previous fuel feeding to estimate the ethanol concentration. If it is determined that the ethanol concentration was estimated, the concentration estimation process terminates, while if it is determined that the ethanol concentration was not estimated, the process moves to step S8. In step S8, it is determined whether or not the engine E is driving. How to determine whether or not the engine E is driving is similar to a determination method in step S3. If it is determined that the engine E is not driving, the concentration estimation process terminates, while if it is determined that the engine E is driving, the process moves to step S6.

As described above, by using the actual fuel compensation ratio calculated in the ECU 60, the first predetermined values $\lambda 1_{E0}$ in the first and second air excess ratio maps, and the second predetermined values $\lambda 2_{E0}$ in the third and fourth air excess ratio maps, it is possible to estimate the ethanol concentration of the blended fuel, even for the engine E which may conduct combustion in a fuel-rich state with the air excess ratio in the combustion chamber 23 being less than 1. To be specific, the ECU 60 can estimate the ethanol concentration of the blended fuel, based on the calculated actual fuel compensation ratio Kti, the first predetermined values $\lambda 1_{E0}$ in the first and second air excess ratio maps, and the second predetermined values $\lambda 2_{E0}$ in the third and fourth air excess ratio maps, with reference to the correlation formula (2). Because of this, when the concentration of the alternative fuel is estimated for the internal combustion engine with the air excess ratio in the combustion chamber 23 being less than 1, it is possible to estimate the concentration of the alternative fuel of the blended fuel with reference to the first predetermined values $\lambda 1_{E0}$, unlike the conventional method in which the $O_2$ feedback control is executed when the concentration of the alternative fuel in the blended fuel is zero to derive a fuel injection amount with which the air excess ratio is 1.

Hereinafter, the reason why the ethanol concentration of the alternative fuel can be estimated according to the correlation formula (1) will be explained. It is known that, in the engine operating with the theoretical air-fuel ratio, between the ethanol concentration Ke, and a standard fuel compensation ratio K obtained by dividing a fuel injection amount after the $O_2$ feedback control by a standard fuel injection amount of a fuel injected when the ethanol concentration is zero, a correlation formula (mainly, n=2) is established as follows:

$$Ke=(a_0K^n+a_1K^{n-1}\ldots a_{n-1}K+a_n) \quad (4)$$

The actual fuel compensation ratio Kti is obtained by dividing the fuel injection amount after the $O_2$ feedback control in the engine E by a predetermined fuel injection amount. The first predetermined value $\lambda 1_{E0}$ is a value obtained by dividing an actual air-fuel ratio with 100% gasoline by the theoretical air-fuel ratio. The second predetermined value $\lambda 2_{E0}$ is a value obtained by dividing an actual air-fuel ratio during the $O_2$ feedback control by the theoretical air-fuel ratio. Therefore, by multiplying the actual fuel compensation ratio by the second predetermined value $\lambda 2_{E0}$ and by driving the resulting value by the first predetermined value $\lambda 1_{E0}$, the standard fuel compensation ratio K is derived. Therefore, if the actual fuel compensation ratio Kti is multiplied by the second predetermined value $\lambda 2_{E0}$, the resulting value is divided by the first predetermined value $\lambda 1_{E0}$, and the resulting value is assigned to the standard fuel compensation ratio K in the correlation formula (4), the correlation formula (1) is derived. As a result, the ethanol concentration is estimated by referring to the correlation formula (1).

The above configuration may be modified as follows. Each predetermined fuel injection amount in the fuel map in the ECU 60 may be set so that the air excess ratio in the combustion chamber 23 exceeds 1. Thus, the first predetermined values $\lambda 1_{E0}$ in the first and second air excess ratio maps are set to values exceeding 1. Since the first predetermined values $\lambda 1_{E0}$ are set to such values, it is possible to estimate the ethanol concentration of the blended fuel even for the engine operating under a state where the air excess ratio in the combustion chamber 23 is more than 1, i.e., a lean-burn engine.

In the concentration estimation process, in step S1, it is determined whether or not fuel feeding has occurred based on a change in a fluid level of the fuel tank 12. Alternatively, it may be determined whether or not fuel feeding has occurred, based on opening and closing of a cap for closing a fuel feeding port of the fuel tank 12. Although in the idling concentration estimation process, the ECU 60 switches the fuel map to the theoretical air-fuel ratio in step S42, it may estimate the ethanol concentration by a method similar to that used in the driving concentration estimation process without switching the fuel map to the theoretical air-fuel ratio.

Alternatively, a correlation formula which is created by modifying the correlation formula (1) may be stored. For example, a calculation method may be used, in which a calculated value $K_{TT}$ may be derived preliminarily by multiplying the actual fuel compensation ratio Kti by the second predetermined value $\lambda 2_{E0}$, and by dividing the resulting value by the first predetermined value $\lambda 1_{E0}$, and may be assigned to the modified correlation formula. To be specific, a correlation formula (5) and a formula (6) are stored:

$$Ke = (a_0 K_{TT}^2 + a_1 K_{TT}^1 + a_2) \quad (5)$$

$$K_{TT} = Kti(\lambda 2_{E0}/\lambda 1_{E0}) \quad (6)$$

The concentration Ke may be calculated according to these formulae and based on the actual fuel compensation ratio Kti, the first predetermined values $\lambda 1_{E0}$, and the second predetermined values $\lambda 2_{E0}$.

Instead of using the correlation formulae, a correlation map having a correspondence between the ethanol concentrations, and the actual fuel compensation ratios Kti, the first predetermined values $\lambda 1_{E0}$, and the second predetermined values $\lambda 2_{E0}$ may be stored in the ECU 60, and the ECU 60 may estimate the ethanol concentration based on the correlation map, the actual fuel compensation ratio Kti, the first predetermined value $\lambda 1_{E0}$, and the second predetermined value $\lambda 2_{E0}$.

The alternative fuel contained in the blended fuel is not limited to ethanol, but may be an alcohol fuel such as methanol. Any other fuel may be used so long as it serves as an alternative fuel of gasoline. A concentration of a component gas contained in the exhaust gas, other than $O_2$, is detected and feedback control may be executed based on the detected concentration. For example, this is implemented by providing a sensor for sending an output according to carbon monoxide, hydrocarbon, or nitrogen oxide, to the ECU 60.

The ethanol concentration may be estimated based on only the actual fuel compensation ratio Kti and the first predetermined value $\lambda 1_{E0}$, assuming that the second predetermined value $\lambda 2_{E0}$ is 1, i.e., the air excess ratio during the $O_2$ feedback control is 1. In this case, the ethanol concentration of the blended fuel may be estimated based on the actual fuel compensation ratio Kti and the first predetermined value $\lambda 1_{E0}$, with reference to a correlation formula (7) in which the second predetermined value $\lambda 2_{E0}$ in the formula (2) is 1:

$$Ke = \{a_0(Kti/\lambda 1_{E0})^2 + a_1(Kti/\lambda 1_{E0}) + a_2\} \quad (7)$$

When the ethanol concentration is estimated without considering the second predetermined value $\lambda 2_{E0}$, for example, an error of about 10% ($\Delta Ke$) is generated with respect to the ethanol concentration estimated by considering the second predetermined value $\lambda 2_{E0}$, as indicated by one-dotted line in FIG. 8. However, since a step for selecting the second predetermined value $\lambda 2_{E0}$, or the like may be omitted, calculation for estimating the concentration becomes easier. As a result, a calculation burden on the ECU 60 can be lessened.

The present invention is not limited to the above described embodiment, but may be added, deleted or altered within a scope of the invention.

INDUSTRIAL APPLICABILITY

The present invention is applicable to an alternate fuel concentration estimating system for estimating a concentration of an alternative fuel contained in a blended fuel in which the alternative fuel is mixed with a basic fuel, in an internal combustion engine which combusts the blended fuel, a vehicle including the alternate fuel concentration estimating system, and an alternative fuel concentration estimating method.

REFERENCE CHARACTER LIST

E engine
1 motorcycle
12 fuel tank
15 gear position sensor
20 cylinder head
23 combustion chamber
47 injector
49 air-intake pressure sensor
54 $O_2$ sensor
55 crank angle sensor
56 fluid level sensor
60 ECU
61 throttle opening degree sensor

The invention claimed is:

1. An alternative fuel concentration estimating system applied to an object including an internal combustion engine which combusts in a combustion chamber a blended fuel in which an alternative fuel is mixed with a basic fuel and a fuel injection device in which a predetermined fuel injection amount is preset such that an air excess ratio in the combustion chamber is a first predetermined value other than 1 when a concentration of the alternative fuel in the blended fuel is zero, the system comprising:
  an air excess ratio control means for compensating a fuel injection amount of the fuel injection device so that the air excess ratio in the combustion chamber reaches a second predetermined value, based on a concentration of at least one component gas contained in an exhaust gas which is derived from an output value of an exhaust gas sensor provided in an exhaust system of the internal combustion engine;
  a fuel compensation ratio calculating means for calculating an actual fuel compensation ratio by dividing by the predetermined fuel injection amount, the fuel injection amount having been compensated so that the air excess ratio in the combustion chamber reaches the second predetermined value, based on the concentration of the at least one component gas; and
  a concentration estimating means for estimating the concentration of the alternative fuel based on the actual fuel compensation ratio calculated by the fuel compensation ratio calculating means, and the first predetermined value.

2. The alternative fuel concentration estimating system according to claim 1,
  wherein the concentration estimating means is configured to estimate the concentration of the alternative fuel based on the actual fuel compensation ratio, the first predetermined value and the second predetermined value.

3. The alternative fuel concentration estimating system according to claim 2,
wherein the concentration estimating means is configured to estimate the concentration Ke of the alternative fuel in the blended fuel, based on the actual fuel compensation ratio Kti, the first predetermined value $\lambda 1_{E0}$ and the second predetermined value $\lambda 2_{E0}$, with reference to a correlation formula:

$$Ke = [a_0\{Kti(\lambda 2_{E0}/\lambda 1_{E0})\}^n + a_1\{Kti(\lambda 2_{E0}/\lambda 1_{E0})\}^{n-1} \ldots a_{n-1}\{Kti(\lambda 2_{E0}/\lambda 1_{E0})\} + a_n]$$

where Ke is the concentration of the alternative fuel of the blended fuel, $a_0, a_1, a_2, \ldots, a_n$ are predetermined coefficients, and n is a predetermined constant.

4. The alternative fuel concentration estimating system according to claim 2,
wherein the air excess ratio control means is configured to compensate the fuel injection amount of the fuel injection device when the internal combustion engine is idling or driving at a medium to high speed; and
the concentration estimating means is configured to estimate the concentration of the alternative fuel after the actual fuel compensation ratio calculated by the fuel compensation ratio calculating means is stabilized.

5. The alternative fuel concentration estimating system according to claim 2, further comprising:
an engine speed control means for increasing an engine speed of the internal combustion engine;
wherein the engine speed control means is configured to increase the engine speed when the internal combustion engine is idling and the air excess ratio control means compensates the fuel injection amount of the fuel injection device.

6. The alternative fuel concentration estimating system according to claim 2, further comprising:
a fuel increase detecting means for detecting an increase in the blended fuel stored in a storage tank;
wherein the concentration estimating means determines a predetermined reference concentration as the estimated concentration of the alternative fuel, if the concentration of the alternative fuel is not estimated and the air excess ratio control means is in a stopped state, after the fuel increase detecting means has detected the increase in the blended fuel.

7. A vehicle comprising:
the alternate fuel concentration estimating system as recited in claim 1;
an internal combustion engine which combusts in a combustion chamber a blended fuel in which an alternative fuel is mixed with a basic fuel; and
a fuel injection device in which a predetermined fuel injection amount is preset such that an air excess ratio in the combustion chamber is a first predetermined value other than 1 when a concentration of the alternative fuel in the blended fuel is zero.

8. An alternative fuel concentration estimating method for estimating a concentration of an alternative fuel in a blended fuel in which the alternative fuel is mixed with a basic fuel, when a predetermined fuel injection amount is preset such that an air excess ratio in the combustion chamber is a first predetermined value other than 1 when a concentration of the alternative fuel in the blended fuel is zero in an internal combustion engine which combusts the blended fuel in the combustion chamber, the method comprising:
calculating an actual fuel compensation ratio by dividing by the predetermined fuel injection amount, a fuel injection amount having been compensated so that the air excess ratio in the combustion chamber reaches a second predetermined value, based on a concentration of at least one component gas contained in an exhaust gas exhausted from the internal combustion engine; and
estimating the concentration of the alternative fuel based on the calculated actual fuel compensation ratio, the first predetermined value, and the second predetermined value, which is an air excess ratio in the combustion chamber when the fuel injection device injects a fuel with the compensated fuel injection amount.

9. An alternative fuel concentration estimating system applied to an object including an internal combustion engine which combusts in a combustion chamber a blended fuel in which an alternative fuel is mixed with a basic fuel and a fuel injection device in which a predetermined fuel injection amount is preset such that an air excess ratio in the combustion chamber is 1 or a first predetermined value other than 1 when a concentration of the alternative fuel in the blended fuel is zero, the system comprising:
an air excess ratio control means for compensating a fuel injection amount of the fuel injection device so that the air excess ratio in the combustion chamber reaches a second predetermined value, based on a concentration of at least one component gas contained in an exhaust gas which is derived from an output value of an exhaust gas sensor provided in an exhaust system of the internal combustion engine; and
a fuel compensation ratio calculating means for calculating an actual fuel compensation ratio by dividing the fuel injection amount having been compensated so that the air excess ratio in the combustion chamber reaches the second predetermined value, based on the concentration of the at least one component gas, by the predetermined fuel injection amount; and
a concentration estimating means for estimating the concentration of the alternative fuel based on the actual fuel compensation ratio calculated by the fuel compensation ratio calculating means, the first predetermined value, and the second predetermined value.

* * * * *